US007347649B2

(12) United States Patent
Duerr et al.

(10) Patent No.: US 7,347,649 B2
(45) Date of Patent: Mar. 25, 2008

(54) POWDER PURGE TUBE

(75) Inventors: Thomas Duerr, Tamm (DE); Hans-Georg Fritz, Ostfildern (DE); Joachim Hering, Dürmentingen (DE)

(73) Assignee: Durr Systems, Inc., Auburn Hills, MI (US)

(*) Notice: Subject to any disclaimer, the term of this patent is extended or adjusted under 35 U.S.C. 154(b) by 1139 days.

(21) Appl. No.: 11/184,013

(22) Filed: Jul. 11, 2003

(65) Prior Publication Data

US 2006/0000933 A1 Jan. 5, 2006

(30) Foreign Application Priority Data

Jul. 11, 2002 (DE) ................................ 102 31 421

(51) Int. Cl.
*B65G 53/00* (2006.01)

(52) U.S. Cl. ............................ 406/49; 406/14; 406/50; 406/51; 406/89; 406/192

(58) Field of Classification Search .................. 406/14, 406/49, 50, 51, 89, 192, 198
See application file for complete search history.

(56) References Cited

U.S. PATENT DOCUMENTS 3,480,984 A * 12/1969 Kidd ..................... 15/104.061
4,249,475 A * 2/1981 Lindsey ...................... 118/105
4,294,869 A * 10/1981 Bassompierre-Sewrin .. 427/177
4,376,135 A 3/1983 Patel et al. .................... 427/31
4,521,462 A 6/1985 Smythe ....................... 427/421
4,572,437 A 2/1986 Huber et al. ................ 239/703
4,584,963 A * 4/1986 Morinaga et al. ........... 118/663
4,589,597 A 5/1986 Robisch et al. ............. 239/703
4,684,064 A 8/1987 Kwok ......................... 239/223
4,715,314 A 12/1987 Ramseier et al. ........... 118/631
4,852,810 A 8/1989 Behr et al. .................. 239/703
4,856,941 A * 8/1989 Morimoto et al. ............ 406/85
4,904,127 A * 2/1990 Morimoto et al. ............ 406/50
4,919,333 A 4/1990 Weinstein ................... 239/223
4,927,081 A 5/1990 Kwok et al. ................ 239/223
4,944,459 A 7/1990 Watanabe et al. ........... 239/305
4,955,960 A 9/1990 Behr et al. ...................... 239/3
4,996,940 A * 3/1991 Cleary ........................ 118/306
5,011,086 A 4/1991 Sonnleitner et al. ........ 239/691
5,056,962 A * 10/1991 Morimoto et al. ............ 406/49
5,078,321 A 1/1992 Davis et al. ................ 239/224
5,089,297 A * 2/1992 Koga et al. ................. 427/238
5,127,125 A 7/1992 Skibowski ............. 15/104.061

(Continued)

FOREIGN PATENT DOCUMENTS

DE 41 05 116 A 1 8/1992

(Continued)

*Primary Examiner*—Joe Dillon, Jr.
(74) *Attorney, Agent, or Firm*—Howard & Howard Attorneys, P.C.

(57) ABSTRACT

To supply a powder lacquer sprayer, the coating powder is pressed by a pig through the supply line and, in the process, it is fluidized from the side of the pig which is turned toward the powder. The fluidization air can be led to the powder, for example, by a central passage opening of the pig or through an air permeable wall of the connection line. For the dosage of the coating powder, one uses the push medium which drives the pig.

21 Claims, 4 Drawing Sheets

U.S. PATENT DOCUMENTS

| | | | | | |
|---|---|---|---|---|---|
| 5,211,514 | A * | 5/1993 | Morimoto et al. | .......... | 406/186 |
| 5,230,842 | A * | 7/1993 | Munde | ........................ | 264/34 |
| 5,294,217 | A | 3/1994 | Talacko et al. | ............... | 406/91 |
| 5,300,006 | A | 4/1994 | Tanaka et al. | ................ | 483/56 |
| 5,397,063 | A | 3/1995 | Weinstein | ................... | 239/703 |
| 5,622,563 | A | 4/1997 | Howe et al. | ................ | 118/620 |
| 5,633,038 | A * | 5/1997 | Ruschau | ..................... | 427/239 |
| 5,633,306 | A | 5/1997 | Howe et al. | ................ | 524/409 |
| 5,662,278 | A | 9/1997 | Howe et al. | ................ | 239/700 |
| 5,683,032 | A | 11/1997 | Braslaw et al. | ................ | 239/7 |
| 5,704,977 | A | 1/1998 | Baumann et al. | ........... | 118/323 |
| 5,853,629 | A * | 12/1998 | Toyoda et al. | ................ | 264/35 |
| 5,865,380 | A | 2/1999 | Kazama et al. | ............. | 239/704 |
| 6,037,010 | A | 3/2000 | Kahmann et al. | ........... | 427/421 |
| 6,090,450 | A | 7/2000 | Kahmann et al. | ........... | 427/421 |
| 6,508,610 | B2 | 1/2003 | Dietrich | ....................... | 406/13 |
| 6,589,348 | B2 | 7/2003 | Ott | ............................ | 118/684 |
| 7,213,290 | B2 * | 5/2007 | Martin et al. | .......... | 15/104.061 |

FOREIGN PATENT DOCUMENTS

| | | |
|---|---|---|
| DE | 43 42 128 A1 | 6/1995 |
| DE | 196 10 588 A 1 | 9/1997 |
| DE | 197 09 988 A 1 | 10/1998 |
| DE | 197 42 588 A1 | 4/1999 |
| DE | 198 30 029 A 1 | 1/2000 |
| DE | 199 09 369 A 1 | 9/2000 |
| DE | 199 37 425 A 1 | 3/2001 |
| DE | 100 33 986 A 1 | 1/2002 |
| DE | 100 63 234 C 1 | 7/2002 |
| DE | 101 30 173 A 1 | 1/2003 |
| DE | 101 42 355 | 3/2003 |
| EP | 0 200 681 | 11/1986 |
| EP | 0 283 918 B1 | 3/1988 |
| EP | 0 171 042 B1 | 7/1988 |
| EP | 0 238 031 B1 | 10/1990 |
| EP | 0 525 303 B1 | 2/1993 |
| EP | 0 767 005 A1 | 4/1997 |
| EP | 0 801 991 A3 | 8/1998 |
| EP | 0 904 848 A1 | 3/1999 |
| EP | 0 967 016 A1 | 12/1999 |
| EP | 1 108 475 A2 | 6/2001 |
| EP | 1 114 677 A1 | 7/2001 |
| EP | 1 118 388 A1 | 7/2001 |
| EP | 0 796 663 B1 | 8/2001 |
| EP | 1 172 152 A1 | 1/2002 |
| EP | 1 186 349 A1 | 3/2002 |
| WO | WO 94/22589 | 10/1994 |
| WO | WO 00/44504 | 1/1999 |

* cited by examiner

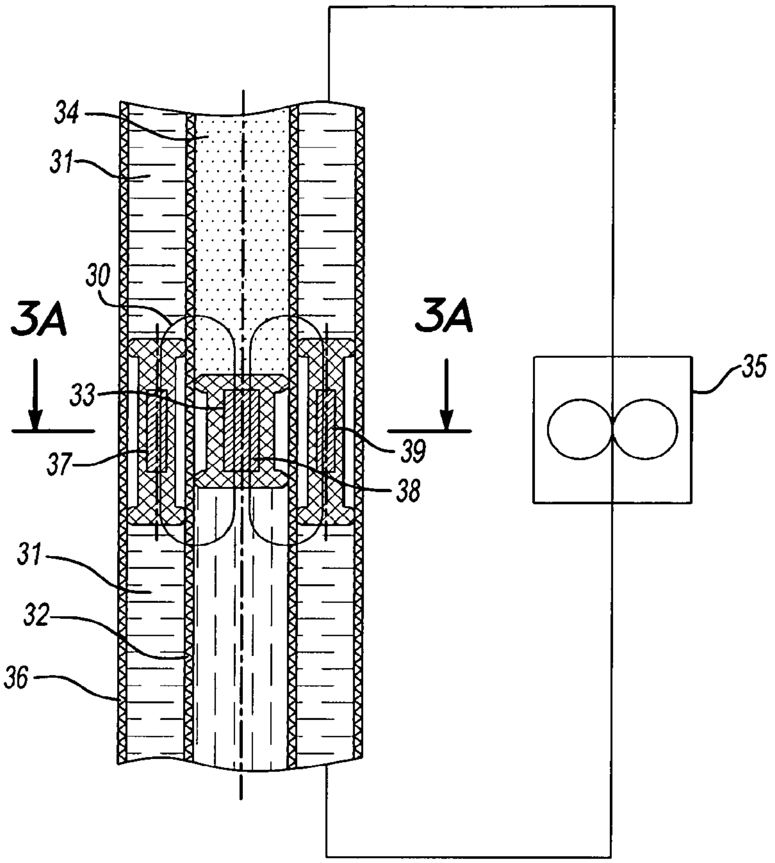
Fig-3
Fig-3A
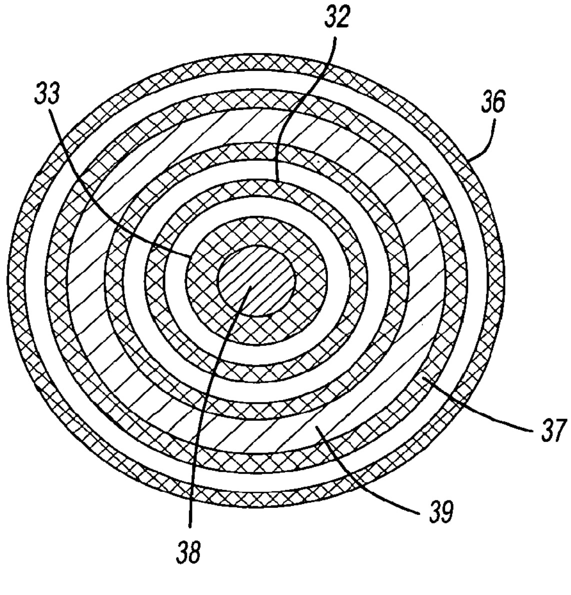

POWDER PURGE TUBE

BACKGROUND OF THE INVENTION

1. Field of the Invention

The invention relates to a method and a system for supplying a powder coating device. In particular, it relates to the series coating of workpieces such as, for example, car bodies, with powder lacquer.

2. Relevant Prior Art

Until now, powder lacquers have usually been aspired with the aid of a suction injector, which works on the Venturi principle, from a container fluidized with air and they are conveyed through plastic hoses in a powder-air mixture to the sprayer, in a process in which a small powder volume is conveyed in a large volume of air, in order to overcome the pressure drop in the conveyor hoses, although this leads to high flow velocities and the resulting tendency to form deposits in the conveyor hose. Any deposits have to be removed after the coating, at considerable effort by means which include emptying the hose by blowing, because any powder residues which later disengage, interfere with the coating and lead to errors in color during a color switch. “Color entrainments” to date cannot be entirely prevented because of the incompleteness of the cleaning of the hose. In addition, any powder residues removed during the cleaning of the hose are lost for the coating and have to be disposed of.

Additional undesired losses of powder are the result of imprecise dosage, with respect to quantity and/or switching times, of the coating powder supplied to the sprayer. Any powder which during the coating is sprayed as “overspray,” and which does not become deposited on the workpiece, can be collected in part and worked up for renewed use, however, from a technological and ecological point of view it is advantageous to keep the quantity of overspray as small as possible. This problem is also not solved satisfactorily by special, relatively expensive, dosage installations of known powder coating installations (EP 0 525 303, DE 199 37 425).

The difficulties in the cleaning of the powder hoses also have been one of the reasons why, at this time, no powder coating installations for car bodies, which would allow a rapid and frequent changing of paint color, are yet in use. To the extent that a change in powder color paint has been used in other branches of industry, one either had to use a corresponding large number of color specific lacquering booths, or one had to completely clean and refit the lacquering booth for each change in paint color (EP 0 200 681).

In the series coating of workpieces, such as car bodies, with a liquid lacquer and frequent changes of color, pigging systems have been used for some time for purposes including the reduction of lacquering and solvent losses (DE 197 09 988, DE 197 42 588, DE 100 33 986). For conveying powder lacquer, pigs so far could not be used without problem because the usual fluidization by means of an air stream in the direction of conveyance has not been possible because the pig blocked the line, and because of the high coefficients of friction, because of the tendency of the lacquer powder to deposit by sintering under pressure and to deposit during the conveyance, as well as because of the absence of compressibility.

SUMMARY OF THE INVENTION

The invention is based on the problem of indicating a method and a system for supplying a powder coating device, which allow a precisely dosed conveyance of the coating powder without the powder losses which are unavoidable with known powder coating installations.

The problem is solved by the characteristics of the claims.

The invention allows a practically loss free transport of the powder quantity which in each case is metered exactly for one coating process. At the same time, the relatively sensitive powder lacquer is transported under substantially milder conditions due to the lower transport speed with corresponding high packing density, in comparison to the Venturi based conveyance which has been conventionally used to date. The low requirement of air for the conveyance of the powder lacquer is also advantageous.

A precise dosage, which lowers the overspray losses, among other factors, is also achieved as a result of the switch times which are kept as short as possible according to the invention during the switching on and switching off of the powder conveyance (according to the invention, the push medium).

The pig used according to the invention, however, not only allows a loss free transport of powder, but at the same time it allows, for liquid lacquer systems which in themselves are known, a very simple cleaning of the lines by completely stripping off all adhering powder residues. As a result of the complete hose cleaning, the entrainment of color paint is prevented.

The invention is particularly advantageous, moreover, with regard to color change possibilities, for example, because of shorter color change times and reduced paint losses.

An additional advantage of the invention is the possibility, which in conventional powder lacquer coating installations to date could not be implemented without problem, to reduce powder losses by reflow and push out in the conventional manner for the fluid lacquer systems. Reflow denotes the powder supply of unsprayed coating material which is returned back, by a pig from the line system leading to the sprayer, into the powder supply of the pigging line. The return by means of a pig is made possible by factors including that the pig in the system described here can be pushed and can convey both in the direction toward the sprayer and in the opposite direction through the line.

Advantageously, in the process, a pump which conveys in the direction toward the powder supply can be inserted between the pigging line and the powder supply. In the case of the push out, in contrast, only the powder quantity required in each case for a coating process is introduced into the pigging line, and conveyed by the pig and advantageously by a pump which is connected later in the line in the direction to the sprayer.

Other advantages of the present invention will be readily appreciated as the same becomes better understood by reference to the following Detailed Description when considered in connection with the accompanying drawings.

BRIEF DESCRIPTION OF THE DRAWINGS

The invention is explained in greater detail using the embodiment examples represented in the drawing. In the drawing:

FIG. 3 shows a line for coating powder with a pig, which is moved by a magnetically coupled drive pig;

FIG. 3A shows a cross section through FIG. 3 along the plane A-A;

DETAILED DESCRIPTION OF THE INVENTION

Figure 1:
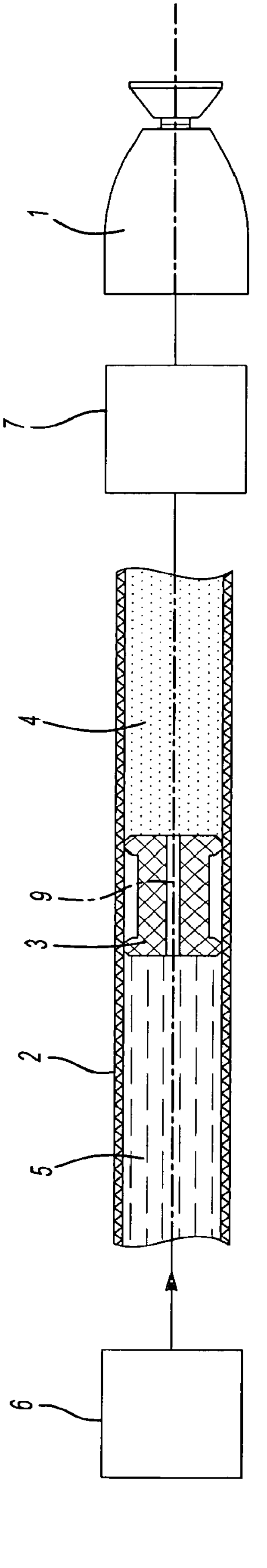
FIG. 1 shows a line for coating powder with a pig which is permeable to air for the fluidization.

According to FIG. 1, a sprayer 1 for powder lacquer, such as, for example, an electrostatic powder rotation sprayer, is connected to a line 2 formed by a piggable hose, through which a pig 3 conveys coating powder 4 in the direction to the sprayer 1. The pig 3 is driven by the push medium labeled 5 and is moved from a loading or sending station 6 into an unloading or target station 7 which is connected in front of the sprayer 1.

In the sending station 6, the push medium 5 is introduced at the back side of the pig 3 and the coating powder 4 is introduced at its front side which is turned toward its target station 7. In the example considered, pressurized air can be used as push medium 5.

During its transport through the line 2, one should add to the coating powder 4, on the side of the pig 3 turned toward the target station 7, a fluidization medium, in general air, to prevent deposition and attachment by sintering of the powder 4. According to FIG. 1, one uses, as fluidization medium for the coating powder 4, the push medium 5 of the pig 3, which, through a continuous opening through the pig along its direction of movement, such as, for example, the represented central bore 9, arrives in the coating powder 4 on the front side of the pig 3.

The pig 3, which in this example is permeable to air, should be applied with its circumference preferably completely and without gaps against the internal wall of the line 2, so that, during its movement through the line 2, the powder 4 is completely stripped off and no powder 4 residues remain behind the pig 3. Its passage opening should therefore not be located at its circumference, but, like for example, the bore 9, should be at a radial distance from the circumferential parts which are applied to the line 2. The circumferential parts can, according to the representation, project radially at the axial ends of the pig 3 beyond the middle part of the pig 3, and they can be designed, in a known manner, as sealing lips.

For the dosage of the coating powder 4 which is introduced into the sprayer 1, the push medium 5 of the pig 3 can be dosed. For this purpose one can provide, for example, a valve arrangement (not shown) which is contained in the sending station 6 of the pig 3 or connected to it, by means of which the quantity, that is a certain volume per unit of time, and/or the pressure of the push medium 5, that is in this ease the pressurized air, can be controlled or regulated with precision, so that the pig 3 conveys a precisely predetermined quantity of powder 4. For the setting of the quantity of air, various devices are known, including proportional valves, as well as valves by means of which the air pressure can be kept constant (for example, similarly to the paint regulation circuits described in DE 101 42 355).

A pig 3 which is permeable to air does not constitute the only possibility of fluidization of the coating powder 4 on the front side of the pig 3. A fluidization which in some cases is better with a more even distribution of the air can be achieved, for example, through a conveyor hose which is permeable to air, which simultaneously can reduce the frictional resistance for the pig 3. In the embodiment example represented in FIG. 2, a line 12 for the coating powder 14 consists of an internal sheath 20 which is permeable to air, in which the pig 13 is moved for conveying the coating powder 14 by its push medium similarly to the way shown in FIG. 1 between its sending station 16 and its target station 17, and of an external sheath 21 which is closed off to the outside. The external sheath 21 can completely enclose the internal sheath 20 and it can form with it a ring shaped air channel 22 for pressurized air which is introduced from outside, penetrates into the internal sheath 20 and fluidizes the coating powder 14 on the front side of the pig 13, while it is applied to the pig 13 on its back side which is turned away from its target station 17, in the direction of drive. By means of the shift air in the line 12, the coating powder 14 can be dosed in a manner similar to that shown in the embodiment example according to FIG. 1.

The pig 13 can here be impermeable to air. The fluidization according to FIG. 2 also has the advantage of allowing a better adjustability of the conveyance and fluidization air quantities and of the conveyance speed.

A variant possibility consists in driving the pig 13 for conveying the coating powder 14 with a solvent used to clean the line 12 as push medium, for example, a cleaning fluid, if a complete separation between the solvent and the coating powder 14 is ensured.

In FIG. 3 and FIG. 3A, an embodiment example is represented, in which a pig 33 that conveys the coating powder 34 through a line 32 is driven, instead of by air or another gaseous push medium, by a fluid dosage medium 31, which is pumped by a dosage pump 35 through a ring shaped external line 36 which surrounds the line 32 concentrically. Suitable dosage pumps 35 are known, for example, from fluid lacquer systems. The dosage fluid medium 31 drives the powder pig 33 indirectly via a ring shaped shift or drive pig 37 which receives pressure from that dosage fluid medium 31 and is located in the external line 36, which drive pig 37 is coupled to the powder pig 33 without contact and force-locked by means of rod or ring shaped magnetic elements 38 or 39 located in the pigs 33 and 37, whose magnetic field is indicated with 30.

To support the drive of the powder pig 33, the latter can be additionally subjected to shift air on its back side. When the pig 33 is permeable to air, similarly to the representation of FIG. 1, this shift air can be used to fluidize the coating powder 34. Otherwise, the coating powder 34 could be fluidized from the end of the line 32 located on the side of the sprayer or, more generally, in the direction opposite the conveyance direction, if the powder pig 33 conveys in both directions (for example, in reflow operation). It is also conceivable to fluidize the coating powder 34 using an external line which is separate from the dosage channel for the drive pig 37 by means of an air-permeable connection to the line 32 of the coating powder 34.

In the embodiment example according to FIG. 3, there is also the possibility of driving the drive pig 37, instead of with the dosage fluid 31, with dosing air or another gaseous medium as push medium.

Figure 4:
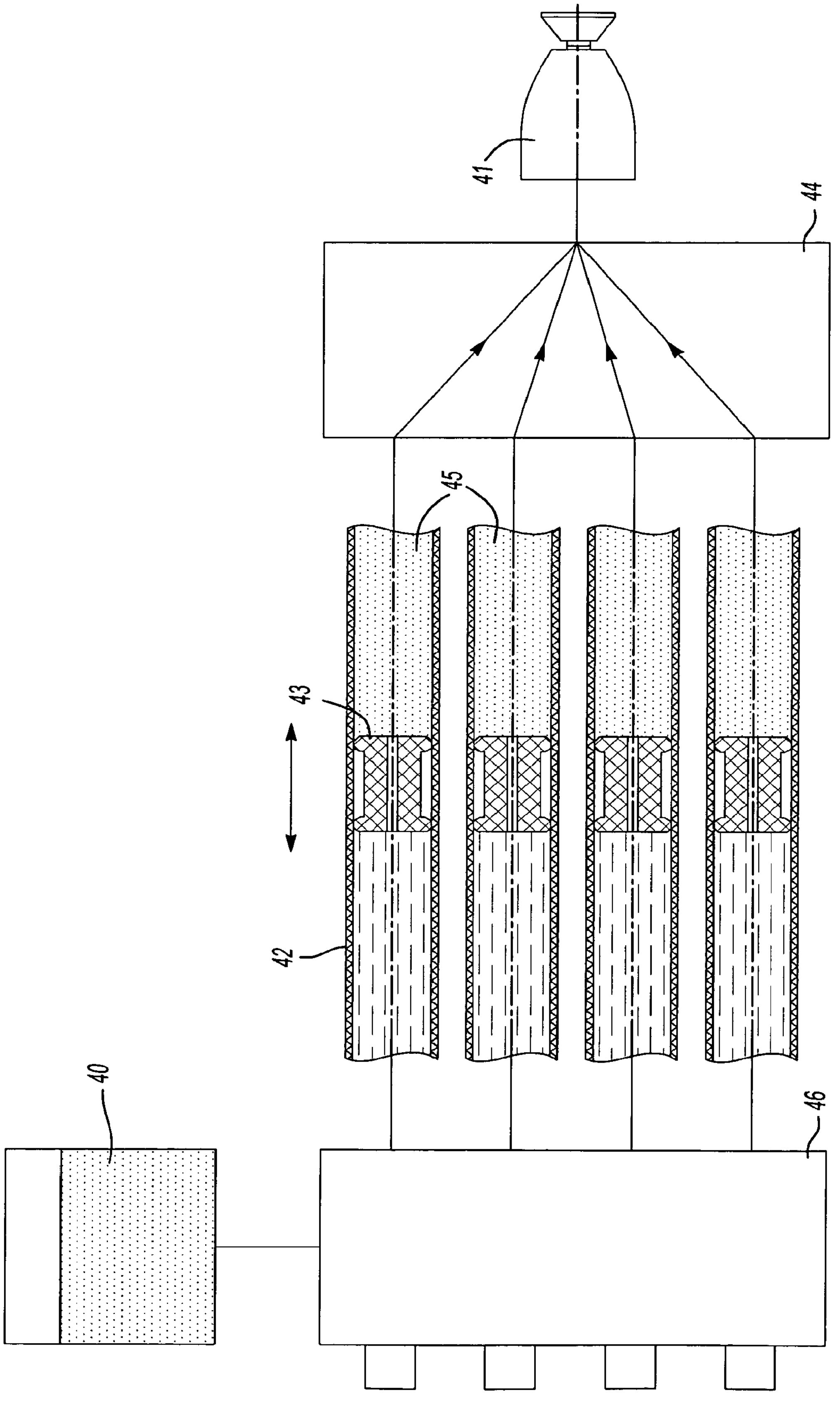
FIG. 4 shows a line arrangement for coating powder with four parallel pigging lines.

To improve the metering precision, it can be advantageous to divide, according to FIG. 4, the entire quantity of coating powder 45 which is to be led to a sprayer 41, into several partial quantities, because the sum of the dosage errors of the partial quantities can in some cases be kept smaller than the error of the total quantity conveyed in a single line. The coating powder 45, which comes out of the container 40, for this purpose is led, in the loading or sending station 46, for example, into the four represented lines 42 that are parallel and lead to the unloading or target station 44, and is conveyed by one pig 43 in each line to the sending station, where the partial quantities are again combined.

However, with an arrangement according to FIG. 4 it is also possible to assign each of the lines 42 (or, if applicable, several lines) to one coating powder 45 having a certain color, and to connect these lines 42 for different colors to paint change installations, in a known manner for liquid lacquer systems to a paint change installation contained, for example, in the target station 44.

Figure 2:
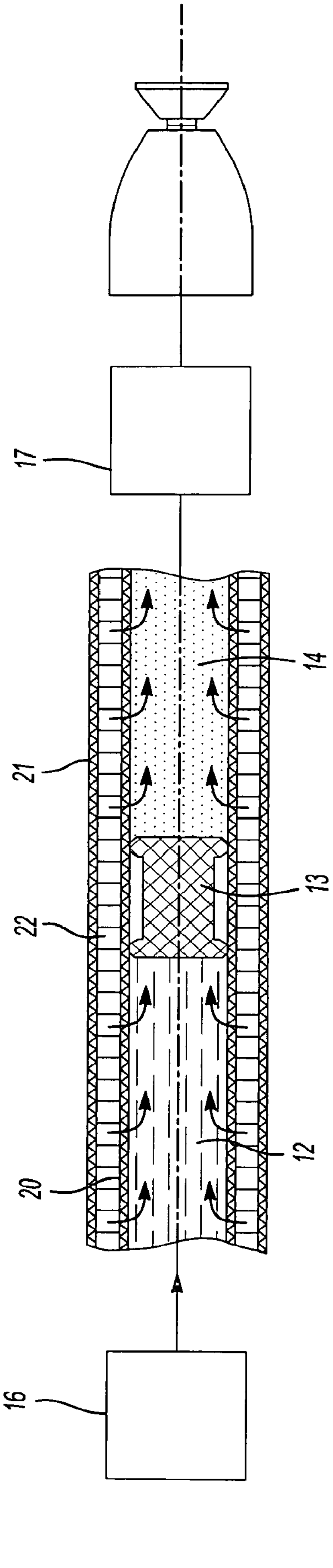
FIG. 2 shows a line with pigging system for coating powder with a hose which is permeable to air for fluidization.

The lines 42 and the pigs 43 can correspond to one of the embodiment examples according to FIG. 1, FIG. 2 or FIG. 3, if the powder is not fluidized in another manner on the front side of the pig 43.

Figure 5:
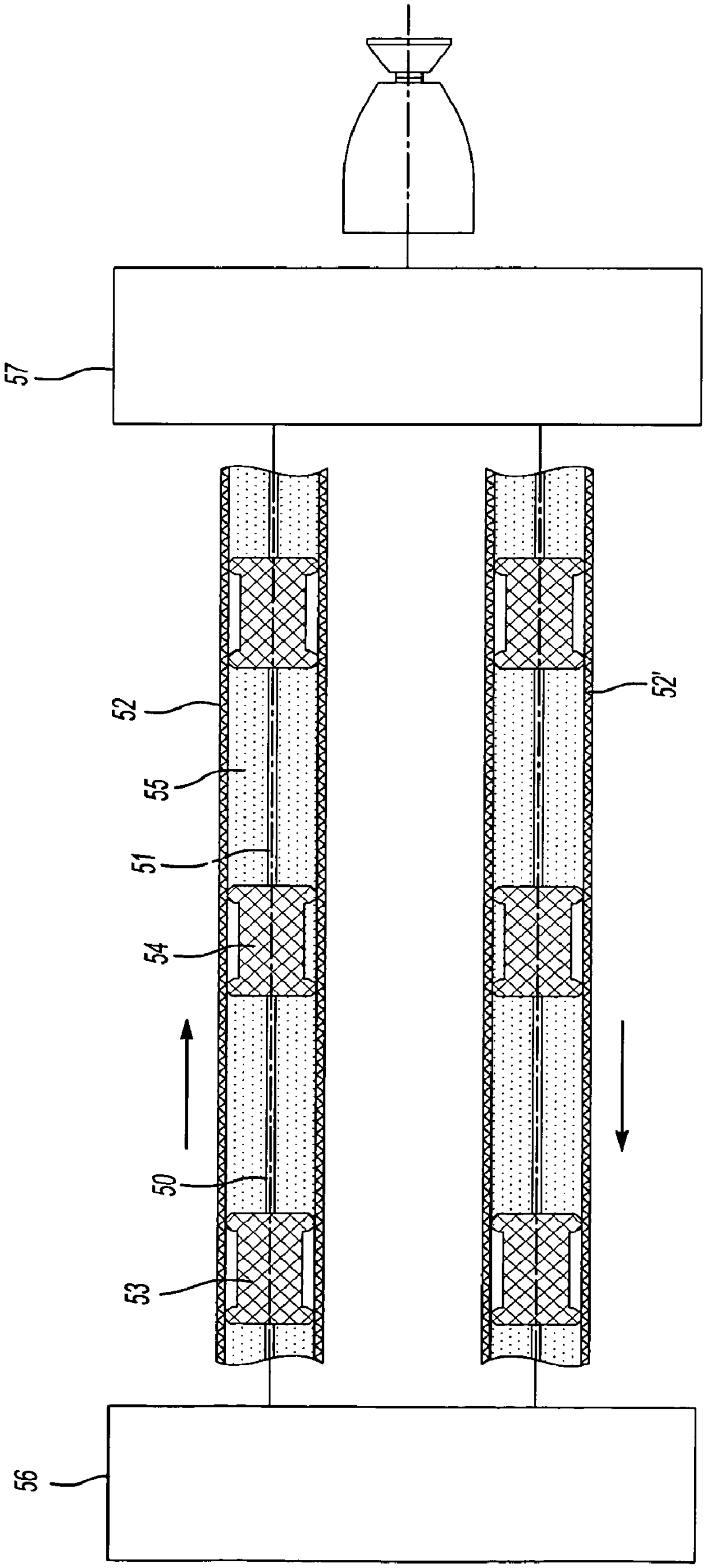
FIG. 5 is a ring line for coating powder with several pigs which are moved one behind the other through the line.

According to FIG. 5, a piggable line 52 leads in a ring pattern from the sending station 56 to the target station 57 and from there back to the sending station 56. Through the line 52, several pigs 53, 54 can be pushed one after the other, where the pigs 53, 54, in each case, form between themselves a space with predetermined volume for the coating powder 55 to be conveyed. The intermediate space between adjacent pigs 53, 54 can be defined, for example, by connection elements 50, 51 with a fixed or adjustable length. The powder 55 which is filled between the pigs can be fluidized, for example, by an air permeable wall of the line 52.

With such an arrangement, it is possible to convey, between the pigs 53, 54, in each case, the required powder 55 quantities, of identical or optionally different color, for a coating process, and to remove them in the target station 57, from which the pigs 53, 54 are shifted back through the return part 52' of the line 52 into the sending station, to be able to again receive defined powder quantities. It is also conceivable to continuously convey through the pigging ring line 52, 52' system a certain coating powder between the sending 56 and the target 57 stations, and to remove the feeding powder 55 from them only if needed, in a manner similar that used in the ring line of known liquid lacquer supply systems.

The invention has been described in an illustrative manner, and it is to be understood that the terminology which has been used is intended to be in the nature of words of description rather than limitation.

Obviously, many modifications and variations of the present invention are possible in light of the above teachings it is, therefore, to be understood that within the scope of the appended claims, wherein reference numerals are merely for convenience and not to be in any way limiting, the invention may be practiced otherwise than as specifically described.

The invention claimed is:

1. A method for supplying a powder coating device with coating powder, mixed with a fluidization medium through a line in a metered manner to the powder coating device comprising the steps of:

providing a line leading to a powder coating device;

providing a pig at a line upstream end;

pressing a stream of coating powder with a pig through the line; and fluidizing the coating powder with fluidization medium supplied on the side of the pig which is turned toward the coating device.

2. The method according to claim 1, including the step of driving the pig through the line with a push medium.

3. The method according to claim 1 wherein the fluidizing step is further defined as directing the fluidization medium to the coating powder through one of at least one opening, which completely goes through the pig in its direction of movement, and through the wall of line, which is permeable to the medium.

4. The method according to claim 2 wherein the fluidizing step is further defined as mixing the push medium with the coating powder to fluidize the coating powder.

5. The method according to claim 1 including the steps of moving the pig with a drive pig, and driving the drive pig in an external line by a push medium.

6. The method according to claim 2 including the step of dosing the push medium by controlling one of a quantity and a pressure of the push medium.

7. The method according to claim 6 including controlling the dosing of the push medium with a dosage pump.

8. The method according to claim 1 including dividing the powder stream into several partial streams, which are each led to a coating device through respective lines and with respective pigs.

9. The method according to claim 8 including directing coating powders of different colors through the respective lines, where each line is assigned to one of the colors, to a color change device which is connected to the lines before the coating device.

10. The method according to claim 1 wherein the pressing step is further defined as pressing the coating powder to a coating device in the line between two or more pigs, each forming between themselves a space with a predetermined volume for the coating powder.

11. The method according to claim 1 including returning the pig from a target station through the line to a sending station.

12. A supply system for supplying a powder coating device with coating powder mixed with a fluidization medium through a line in a metered manner to the powder coating device comprising:

a line having at least one inlet and at least one outlet;

said at least one outlet leading to a powder coating device a pig movable through the line;

means for moving the pig;

wherein a stream of coating powder is pressed with a pig through a line during movement; and a fluidization medium supplied on the side of the pig, which is turned toward the coating device.

13. The supply system according to claim 12, including a dosage device to control a push medium of the pig.

14. The supply system according to claim 12 further defined wherein one of the pig and the line present at least one opening to introduce the fluidizing medium into the line.

15. The supply system according to claim 14, wherein the at least one opening passes through the entire pig, in a direction of movement of the pig and is radially removed from a circumference of the pig, wherein the circumference is applied against an internal wall of the line.

16. The supply system according to claim 12 wherein the line is further defined as being permeable to air.

17. The supply system according to claim 12 including a drive pig which is coupled without contact to the drive pig, and which is moved by means of an external line which runs parallel to the line.

18. The supply system according to claim 17, wherein the external line, which receives the drive pig, concentrically encloses the line, and the pigs are magnetically coupled.

19. The supply system according to claim 18, wherein the external line, which receives the drive pig, contains a dosage fluid and is connected to a dosage pump.

20. The supply system according to claim 12 including a dosage device formed with a valve arrangement for controlling one of a quantity and a pressure of a push medium which drives the pig.

21. The supply system according to one claim 20 wherein the line is further defined as including several lines, which are parallel and are connected to one of a shared container and several containers wherein each of the several containers contain coating powders of different color.

* * * * *

UNITED STATES PATENT AND TRADEMARK OFFICE

CERTIFICATE OF CORRECTION

PATENT NO. : 7,347,649 B2
APPLICATION NO. : 11/184013
DATED : March 25, 2008
INVENTOR(S) : Thomas Duerr, Hans-Georg Fritz and Joachim Hering It is certified that error appears in the above-identified patent and that said Letters Patent is hereby corrected as shown below:

Column 7, line 5, claim 21, please delete “one” between “to” and “Claim.”

Signed and Sealed this

Fifth Day of August, 2008

JON W. DUDAS
*Director of the United States Patent and Trademark Office*